(12) United States Patent
Akiyama et al.

(10) Patent No.: US 10,108,797 B2
(45) Date of Patent: Oct. 23, 2018

(54) MONITORING DEVICE, MONITORING METHOD AND MONITORING PROGRAM

(71) Applicant: NIPPON TELEGRAPH AND TELEPHONE CORPORATION, Chiyoda-ku (JP)

(72) Inventors: Mitsuaki Akiyama, Musashino (JP); Takeo Hariu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 46 days.

(21) Appl. No.: 15/121,272

(22) PCT Filed: Mar. 6, 2015

(86) PCT No.: PCT/JP2015/056660
§ 371 (c)(1),
(2) Date: Aug. 24, 2016

(87) PCT Pub. No.: WO2015/137249
PCT Pub. Date: Sep. 17, 2015

(65) Prior Publication Data
US 2016/0364567 A1   Dec. 15, 2016

(30) Foreign Application Priority Data
Mar. 13, 2014   (JP) .................. 2014-050278

(51) Int. Cl.
*G06F 21/55*   (2013.01)
*G06F 21/56*   (2013.01)
*H04L 29/06*   (2006.01)

(52) U.S. Cl.
CPC .............. *G06F 21/55* (2013.01); *G06F 21/56* (2013.01); *H04L 63/145* (2013.01);
(Continued)

(58) Field of Classification Search
CPC .................................................. H04L 63/1433
See application file for complete search history.

(56) References Cited

U.S. PATENT DOCUMENTS

2005/0022008 A1*   1/2005   Goodman ............ G06Q 10/107
                                                              726/4
2008/0301281 A1*   12/2008   Wang ...................... G06F 21/56
                                                              709/224

(Continued)

FOREIGN PATENT DOCUMENTS

CN   103475669 A   12/2013
GB    2505533 A    3/2014

OTHER PUBLICATIONS

Extended European Search Report dated May 8, 2017 in Patent Application No. 15762284.6.
(Continued)

*Primary Examiner* — Josnel Jeudy
(74) *Attorney, Agent, or Firm* — Oblon, McClelland, Maier & Neustadt, L.L.P.

(57) ABSTRACT

A monitoring device inspects a redirect code inserted into content of a compromised web site, and, in accordance with a result thereof, when information of a new malicious website is described in the redirect code, the monitoring device acquires information of the malicious website and registers the information on a blacklist. In addition, the monitoring device unregisters information of the malicious website that is no longer described in the redirect code in the content from the blacklist.

5 Claims, 8 Drawing Sheets

(52) U.S. Cl.
CPC .. *H04L 63/1433* (2013.01); *G06F 2221/2119* (2013.01); *G06F 2221/2149* (2013.01)

(56) References Cited

U.S. PATENT DOCUMENTS

| | | | |
|---|---|---|---|
| 2012/0036580 A1 | 2/2012 | Gorny et al. | |
| 2012/0084151 A1* | 4/2012 | Kozak | G06Q 30/02 705/14.58 |
| 2012/0084349 A1* | 4/2012 | Lee | G06Q 30/02 709/203 |
| 2014/0098671 A1* | 4/2014 | Raleigh | H04L 41/5003 370/235 |
| 2014/0173730 A1 | 6/2014 | Bejerasco et al. | |
| 2015/0180746 A1* | 6/2015 | Day, II | H04L 51/16 455/405 |
| 2016/0277434 A1* | 9/2016 | Pham | G06Q 20/4016 |

OTHER PUBLICATIONS

Arash Nourian, et al. "CASTLE: A Social Framework for Collaborative Anti-Phishing Databases" Collaborative Computing: Networking, Applications and Worksharing, 2009, Collaboratecom 2009. 5th International Conference on, IEEE, XP 031670414, Nov. 11, 2009, pp. 1-10.

Takeshi Yagi, et al., "Analysis of Botnets Using Malware Infection Attacks on Websites", CSS2013 Computer Security Symposium, vol. 2013, No. 4, Total 27 Pages, (Oct. 14, 2013), (with English Translation).

Mitsuaki Akiyama, et al., "Measuring Lifetime of Malicious Website Based on Redirection from Compromised Websites", IPSG SIG Notes Security Psychology & Trust (SPT), Total 28 Pages, (Mar. 20, 2014), (with English Translation).

The Honeynet Project, "Know Your Enemy: Malicious Web Servers", [Online], [retrieval date: Jan. 7, 2014], Internet http://www.honeynet.org/papers/mws Aug. 9, 2007.

Mitsuaki Akiyama, et al., "Searching structural neighborhood of malicious URLs to improve blacklisting", IEEE Computer Society, IEEE/IPSJ SAINT, pp. 1-10, (2011).

Jack W. Stokes, et al., "WebCop: Locating Neighborhoods of Malware on the Web", USENIX LEET, pp. 1-8, (2010).

Luca Invernizzi, et al., "Evilseed: A Guided Approach to Finding Malicious Web Pages", IEE Security and Privacy, Total 15 Pages, (2012).

Mitsuaki Akiyama, et al., "Design and Implementation of High Interaction Client Honeypot for Drive-by-Download Attacks", IEICE Transaction on Communication, vol. E93-B, No. 5, pp. 1131-1139, (May 2010).

International Search Report dated May 19, 2015 in PCT/JP15/056660 Filed Mar. 6, 2015.

Chinese Office Action for Chinese Patent Application No. 201580012784.2, dated Jul. 4, 2018, 13 pages, English translation provided.

\* cited by examiner

WEBSITE A

| APPEARED WEBSITE | Day1 | Day2 | Day3 | Day4 | Day5 | Day6 | Day7 |
|---|---|---|---|---|---|---|---|
| example.com | ▨ | ▨ | ▨ | | | | |
| example.net | | | | ▨ | ▨ | | |
| example.org | | | | | | ▨ | ▨ |

···REDIRECTED

···NOT REDIRECTED

WEBSITE B

| APPEARED WEBSITE | Day1 | Day2 | Day3 | Day4 | Day5 | Day6 | Day7 |
|---|---|---|---|---|---|---|---|
| example.com | | | ▨ | ▨ | | | |
| example.net | | | | | ▨ | | |
| example.org | | | | | | | |

···REDIRECTED

···NOT REDIRECTED

WEBSITE C

| APPEARED WEBSITE | Day1 | Day2 | Day3 | Day4 | Day5 | Day6 | Day7 |
|---|---|---|---|---|---|---|---|
| example.com | | | | | | | |
| example.net | | | ▨ | | | | |
| example.org | | | | ▨ | ▨ | | |

···REDIRECTED

···NOT REDIRECTED

REGARDING example.com

| WEBSITE TO BE INSPECTED | Day1 | Day2 | Day3 | Day4 | Day5 | Day6 | Day7 |
|---|---|---|---|---|---|---|---|
| WEBSITE A | ▨ | ▨ | ▨ | | | | |
| WEBSITE B | | | ▨ | ▨ | | | |
| WEBSITE C | | | | | | | |
| TOTAL | ▨ | ▨ | ▨ | ▨ | | | |

···REDIRECTED
···NOT REDIRECTED

REGARDING example.net

| WEBSITE TO BE INSPECTED | Day1 | Day2 | Day3 | Day4 | Day5 | Day6 | Day7 |
|---|---|---|---|---|---|---|---|
| WEBSITE A | | | | ▨ | ▨ | | |
| WEBSITE B | | | | | ▨ | | |
| WEBSITE C | | | ▨ | | | | |
| TOTAL | | | ▨ | ▨ | ▨ | | |

···REDIRECTED
···NOT REDIRECTED

REGARDING example.org

| WEBSITE TO BE INSPECTED | Day1 | Day2 | Day3 | Day4 | Day5 | Day6 | Day7 |
|---|---|---|---|---|---|---|---|
| WEBSITE A |  |  |  |  |  | ▨ | ▨ |
| WEBSITE B |  |  |  |  |  |  |  |
| WEBSITE C |  |  |  | ▨ | ▨ |  |  |
| TOTAL |  |  |  | ▨ | ▨ | ▨ | ▨ |

···REDIRECTED

···NOT REDIRECTED

MONITORING DEVICE, MONITORING METHOD AND MONITORING PROGRAM

FIELD

The present invention relates to a monitoring device, a monitoring method, and a monitoring program.

BACKGROUND

Websites with malicious intent (hereinafter referred to as malicious websites) have been used for various cyber-attacks such as a malware infection and a phishing attack. By blacklisting malicious websites in advance, it is possible to block access by a user to a malicious website, and to prevent an attack by the malicious website. There are various methods for finding malicious websites. For example, malicious websites are found by inspecting uniform resource locators (URLs) listed by keyword search in search engines, by following hyperlinks, by inspecting URLs of spam mail, and based on user reports (see Non Patent Literatures 1 to 4).

In general, there is an upper limit of the number of entries which can be registered on a blacklist. A volume of processing for matching URL is increased with the increasing number of entries registered on a blacklist. Accordingly, it is preferable to unregister malicious websites no longer used from the blacklist as much as possible. Therefore, countermeasures have been taken, for example, URLs of malicious websites registered on a blacklist are removed after the elapse of a certain period of time (for example, 24 hours, seven days, or the like) (hereinafter referred to as aging), and URLs of malicious websites which do not respond are unregistered.

CITATION LIST

Non Patent Literature

Non Patent Literature 1: The Honeynet Project, "Know Your Enemy: Malicious Web Servers", [online], [retrieval date: Jan. 7, 2014], Internet <http://www.honeynet.org/papers/mws>

Non Patent Literature 2: Mitsuaki Akiyama, "Searching structural neighborhood of malicious URLs to improve blacklisting", IEEE/IPSJ SAINT, 2011

Non Patent Literature 3: Jack W. Stokes, "WebCop: Locating Neighborhoods of Malware on the Web", USENIX LEET, 2010

Non Patent Literature 4: Luca Invernizzi, "EvilSeed: A Guided Approach to Finding Malicious Web Pages", IEEE Security and Privacy, 2012

Non Patent Literature 5: Mitsuaki Akiyama, "Design and Implementation of High Interaction Client Honeypot for Drive-by-Download Attacks", IEICE Transaction on Communication, Vol. 93-B, pp. 1131-1139, 2010

SUMMARY

Technical Problem

However, when URLs are unregistered from a blacklist by the above-described aging, a URL of a website which actually exists as a malicious website may be unregistered.

Even in a method in which a URL of a malicious website which does not respond is unregistered from a blacklist, there is a risk that a malicious website which actually exists is determined to no longer exist by an inspection system when the malicious website uses a technique, which is called cloaking, for circumventing a security inspection. As an example of the cloaking, there is a method in which a malicious website records internet protocol (IP) address information of a client which has accessed the malicious website, and prohibits second and subsequent access from the client having the same IP address.

When the malicious website conducts the cloaking, the inspection system can normally access the malicious website only once. Therefore, for example, in a case where the inspection system confirms the existence of the malicious website by a normal response (response of status code "200 OK") of a hypertext transfer protocol (HTTP), when cloaking is being conducted in the malicious website, the inspection system cannot obtain a response from the malicious website (for example, although status code "200 OK" is responded, content therein is harmless or there is no content therein). As a result, there occurs the following problem: the inspection system determines that the malicious website no longer exists although it actually exists, and unregisters the URL of the malicious website from the blacklist.

An object of the present invention is to solve the above problem and to register information of a malicious website which actually exists on a blacklist.

Solution to Problem

To solve the problems described above and achieve the object, the present invention comprising: an inspection unit that inspects a redirect code inserted into content of a compromised website; an addition unit that adds, in accordance with a result of the inspection, when information of a new website is described in the redirect code, information of the website to a blacklist; and an unregistration unit that unregisters, in accordance with a result of the inspection, information of the website that is no longer described in the redirect code from the blacklist.

Advantageous Effects of Invention

According to the present invention, it is possible to prevent information of a malicious website which actually no longer exists from being registered permanently on a blacklist, without unregistering information of a malicious website which actually exists. As a result, it is possible to add information of a new malicious website on the blacklist, and to suppress an increase in the number of entries on the blacklist to reduce a period of time taken for filtering processing using the blacklist.

DESCRIPTION OF EMBODIMENTS

Hereinbelow, a mode for carrying out the present invention (embodiment) will be described. The present invention is not limited to the embodiment.

Figure 1:
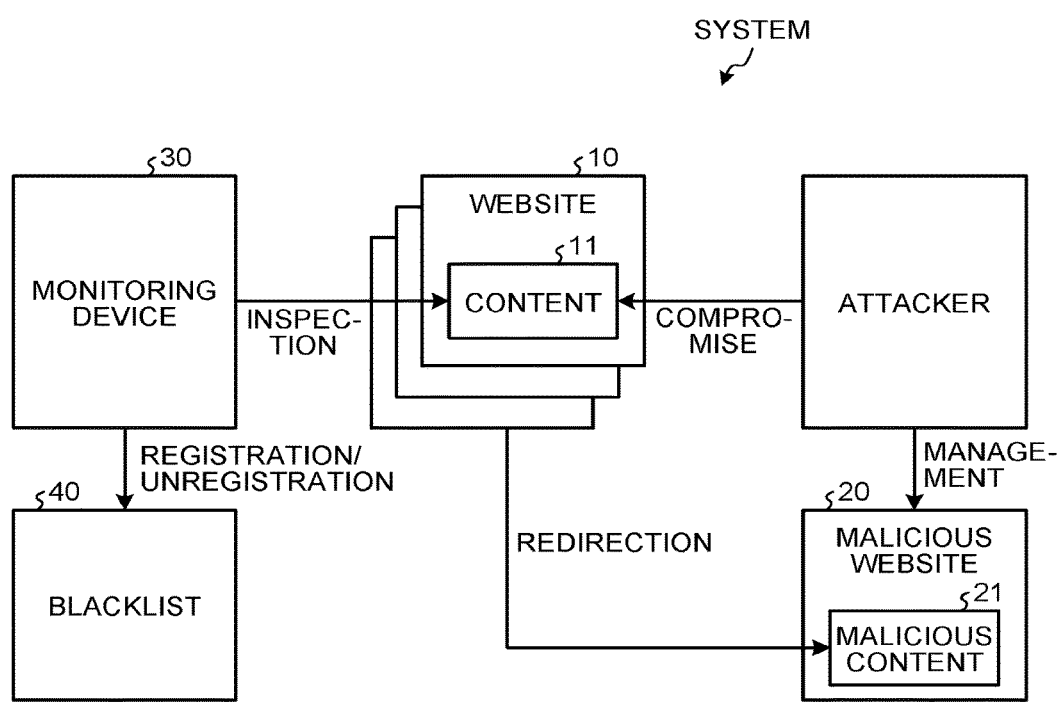
FIG. 1 is a diagram illustrating a configuration of a system according to an embodiment.

A configuration diagram of a system according to the embodiment is illustrated in FIG. 1. The system is configured to include a website 10 to be inspected, a malicious website 20, a monitoring device 30, and a blacklist 40.

The website 10 is a website to be inspected by the monitoring device 30, and it is assumed that the website 10 is known to be compromised in advance. The website 10 includes content 11. It is assumed that the content 11 has been compromised by an attacker and a code (redirect code) for redirecting access to the content 11 to the malicious website 20 is embedded therein.

The malicious website 20 is a website managed by the attacker, and includes malicious content 21.

The monitoring device 30 continuously inspects the redirect code in the content 11 of the website 10, and performs registration on and unregistration from the blacklist 40, using a result of the inspection. For example, when the monitoring device 30 has found information of a new malicious website 20 from the redirect code inserted into the content 11, the monitoring device 30 registers the information of the malicious website 20 on the blacklist 40. Examples of the information of the malicious website 20 include a URL, a fully qualified domain name (FQDN), and an IP address assigned to the FQDN. The monitoring device 30 inspects the redirect code in the content 11 of the website. When it has been found that the redirect code no longer includes the information of the malicious website 20 previously registered on the blacklist 40, the monitoring device 30 unregisters the information of the malicious website 20 from the blacklist 40.

The blacklist 40 is information indicating information of the malicious website 20.

The number of websites 10 to be inspected by the monitoring device 30 may be one, or more than one, as illustrated in FIG. 1.

In addition, there may be a case where even information of a malicious website 20, which is no longer described in the redirect code in the content 11, will be described therein again after the elapse of a predetermined period of time. In that case, even though the monitoring device 30 has once unregistered the information from the blacklist 40, the information will be found in an inspection performed thereafter, and registered on the blacklist 40.

Figure 2:
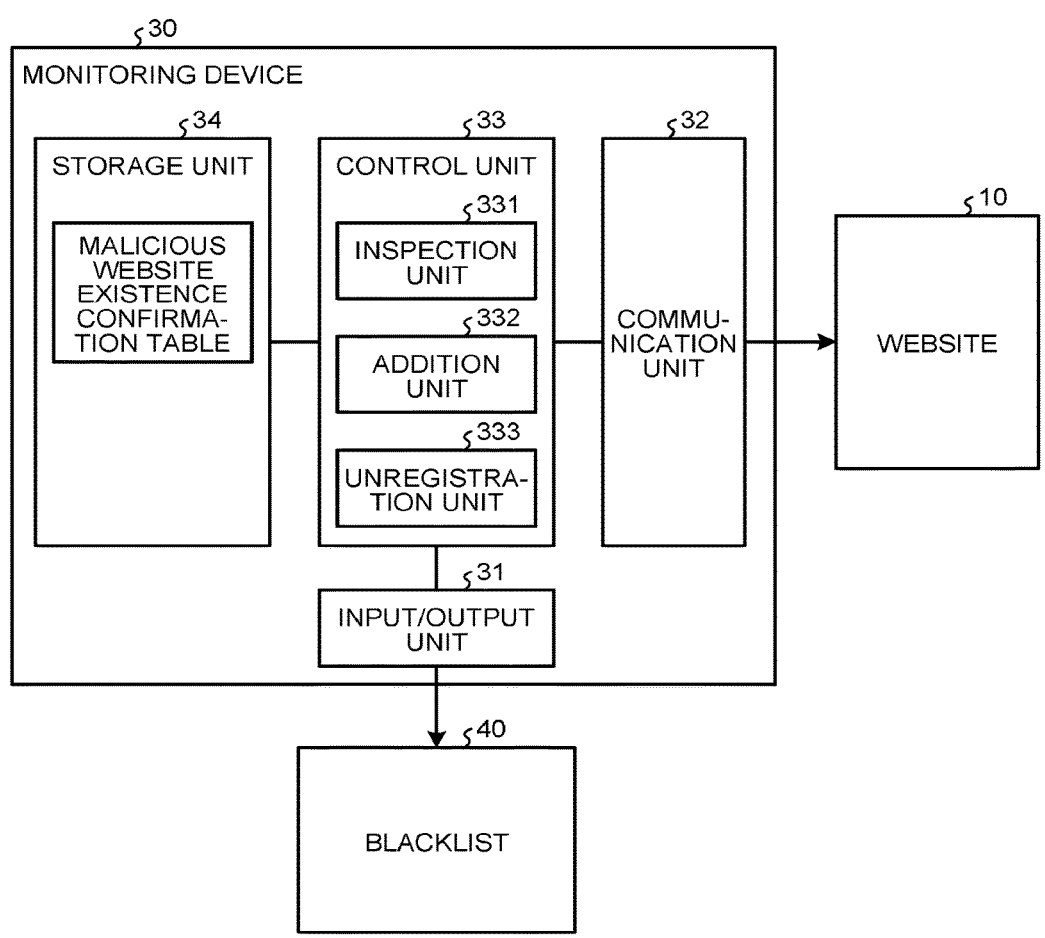
FIG. 2 is a diagram illustrating a configuration of a monitoring device.

Next, the monitoring device 30 will be described in detail using FIG. 2. FIG. 2 is a diagram illustrating a configuration of the monitoring device.

The monitoring device 30 includes an input/output unit 31, a communication unit 32, a control unit 33, and a storage unit 34.

The input/output unit 31 is responsible for input/output of various data between the input/output unit 31 and an external device (for example, a device which stores the blacklist 40). The communication unit 32 is responsible for communication with the website 10, and the like.

The control unit 33 includes an inspection unit 331, an addition unit 332, and an unregistration unit 333.

The inspection unit 331 inspects a redirect code in the content 11 of the website 10 to be inspected. For example, the inspection unit 331 inspects, at predetermined intervals, a redirection destination described in the redirect code in the content 11 of the website 10 to be inspected, specifically, information of the malicious website 20 described in an src attribute of an iframe tag or a script tag of the content 11 (for example, a URL). When the information of the malicious website 20 is described in the redirect code, the inspection unit 331 acquires the information of the malicious website 20, and records the information in a malicious website existence confirmation table in the storage unit 34. Details of the malicious website existence confirmation table will be described later. It is preferable to set the interval of the inspection performed by the inspection unit 331 in consideration of a lifetime of a URL of a general malicious website 20, for example, one day. The reasons therefor are as follows. When the inspection interval is set to be too longer than the lifetime of the URL of the malicious website 20, there may be a case where the inspection is omitted in the inspection unit 331 in spite that the URL of the malicious website 20 exists. When the inspection interval is set to be too shorter than the lifetime of the URL of the malicious website 20, there may be a case where an inspection processing load on the inspection unit 331 increases excessively. The inspection interval described above can be appropriately changed by a user of the monitoring device 30.

The addition unit 332 refers to the malicious website existence confirmation table, and adds, to the blacklist 40, information of a new malicious website 20 described in the redirect code in the content 11 of at least any website 10 among the websites 10 to be inspected.

In accordance with a result of the inspection performed by the inspection unit 331, the unregistration unit 333 unregisters, from the blacklist 40, information of the malicious website 20 which is no longer described in the redirect code in the content 11 of any website 10.

The storage unit 34 stores the above-described malicious website existence confirmation table. The malicious website existence confirmation table is information which indicates the result of the inspection of each website 10 performed by the inspection unit 331, and information which indicates, for each website 10 to be inspected, information of the malicious website 20 (appeared website) described in the redirect code in the content 11 of the website 10, and a period of time during which the information of the malicious website 20 is described, in correspondence to each other. The malicious website existence confirmation table is updated each time the inspection unit 331 performs the inspection.

Figure 3A:
FIG. 3A is a drawing illustrating an example of a malicious website existence confirmation table.
Figure 3A:
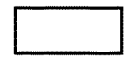
Figure 3B:
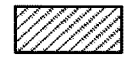
FIG. 3B is a drawing illustrating an example of the malicious website existence confirmation table.
Figure 3B:
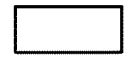
Figure 3C:
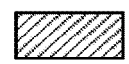
FIG. 3C is a drawing illustrating an example of the malicious website existence confirmation table.
Figure 3C:

The malicious website existence confirmation table includes, for example, a plurality of tables such as those illustrated in FIGS. 3A to 3C. Here, FIG. 3A illustrates a period of time (lifetime) during which each of "example.com", "example.net", and "example.org" is described in the redirection destination of the content 11 of a website A. FIG. 3B illustrates a period of time during which "example.com", "example.net", or "example.org" is described in the redirection destination of the content 11 of a website B. FIG. 3C illustrates a period of time during which "example.com", "example.net", or "example.org" is described in the redirection destination of the content 11 of a website C. In FIGS. 3A to 3C, and FIGS. 4A to 4C, shaded portions represent a period of time during which redirection to the appeared website has occurred in the website.

When a new malicious website 20 is found by the inspection unit 331, information of the appeared website is added to the malicious website existence confirmation table.

Figure 4A:
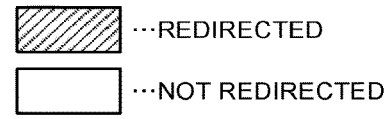
FIG. 4A is a drawing illustrating an example of information extracting, from malicious website existence confirmation tables, a correspondence between information of an appeared website and the lifetime thereof.
Figure 4B:
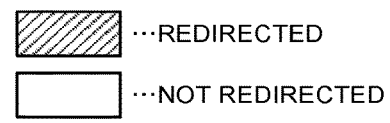
FIG. 4B is a drawing illustrating an example of information extracting, from malicious website existence confirmation tables, a correspondence between information of an appeared website and the lifetime thereof.
Figure 4C:
FIG. 4C is a drawing illustrating an example of information extracting, from malicious website existence confirmation tables, a correspondence between information of an appeared website and the lifetime thereof.
Figure 4C:

Information of a correspondence between the information of the appeared website and the lifetime thereof, which information has been extracted from the malicious website existence confirmation table, is illustrated in FIGS. 4A to 4C. FIG. 4A illustrates the lifetime of "example.com" in each website 10. FIG. 4B illustrates the lifetime of "example.net" in each website 10. FIG. 4C illustrates the lifetime of "example.org" in each website 10.

The row "Total" in the information in FIGS. 4A to 4C indicates that the appeared website has existed in the period of time in any of the websites 10. For example, it is indicated that the "example.com" illustrated in FIG. 4A has existed in the website A from Day 1 to Day 3, has existed in the website B from Day 3 to Day 4, and in totality, has existed from Day 1 to Day 4. Similarly, it is indicated that the "example.net" illustrated in FIG. 4B has existed from Day 3 to Day 5 in totality, and that the "example.org" illustrated in FIG. 4C has existed from Day 4 to Day 7 in totality.

For example, the addition unit 332 refers to the malicious website existence confirmation table described above, and adds, to the blacklist 40, information of a malicious website 20 newly appeared in any website 10 among the websites 10 to be inspected. In addition, the unregistration unit 333 refers to the malicious website existence confirmation table, and unregisters, from the blacklist 40, information of a malicious website 20 which no longer exists in any website 10 among the websites 10 to be inspected. Regarding timing for unregistering the information of the malicious website 20 from the blacklist 40, the timing may be a time point immediately after the unregistration unit 333 has determined, after referring to the malicious website existence confirmation table, that information of the malicious website 20 no longer exists in any website 10 among the websites 10 to be inspected. Alternatively, the timing may be a time point when a predetermined period of time has elapsed after the determination. In the latter case, the unregistration unit 333 unregisters the information, for example, when the inspection interval (for example, one day) set by the inspection unit 331 has elapsed after the determination. By doing so, when there is information of a malicious website 20 which has been determined to no longer exist in the previous inspection but has been determined to exist in the subsequent inspection, it is possible for the unregistration unit 333 to avoid unregistering, from the blacklist 40, the information of the malicious website 20.

(Processing Procedure)

Figure 5:
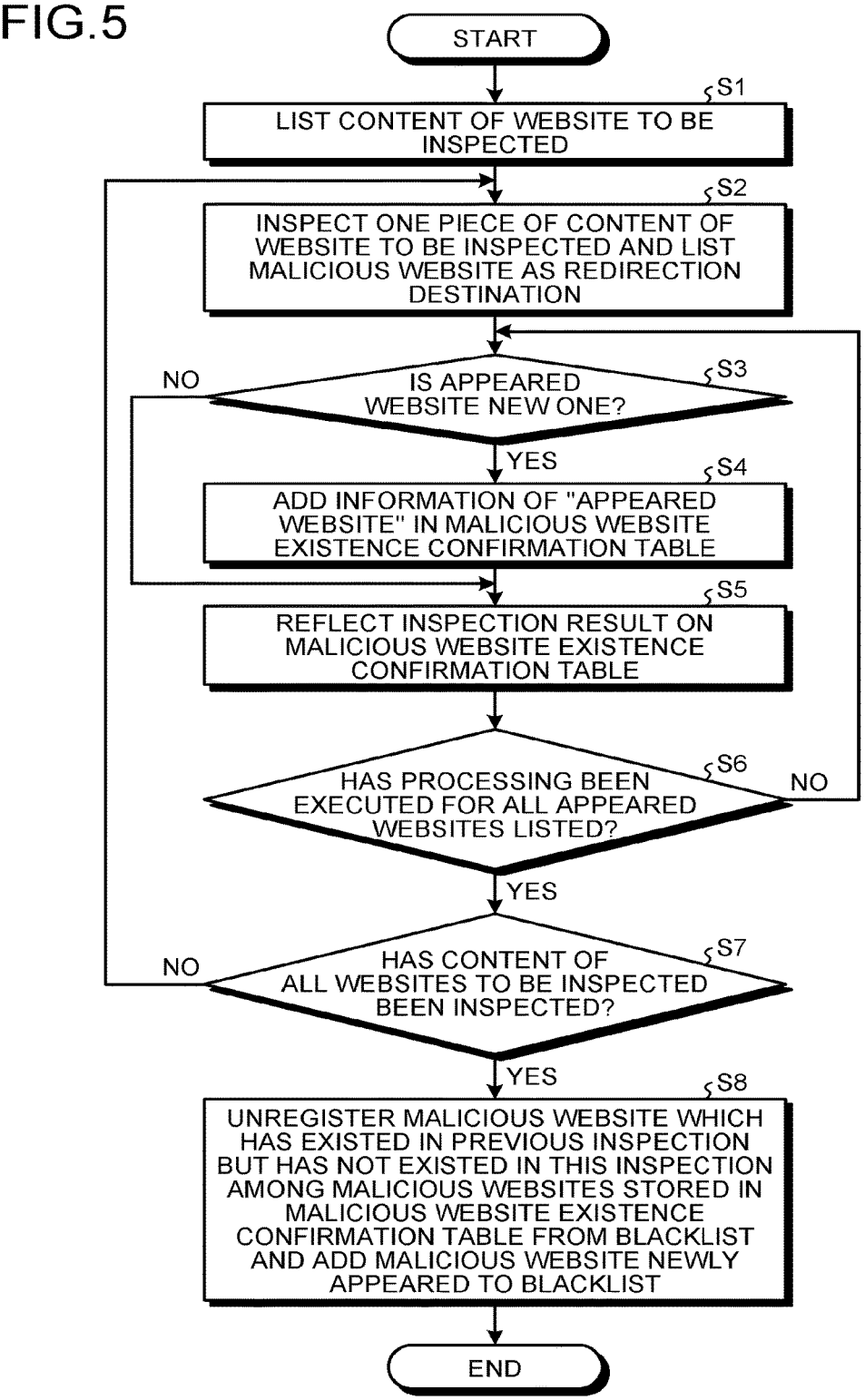
FIG. 5 is a flowchart illustrating a processing procedure performed by the monitoring device.

A flowchart of processing performed by the monitoring device 30 is illustrated in FIG. 5.

First, the inspection unit 331 of the monitoring device 30 lists the content 11 of the website 10 to be inspected (S1). Then, the inspection unit 331 inspects the content 11 of the website 10 to be inspected in order. In other words, the inspection unit 331 inspects one piece of the content 11 of the website 10 to be inspected, and lists a malicious website 20, which is a redirection destination in the content 11 (S2).

When the appeared website (malicious website 20) listed in S2 is a new one (YES in S3), the inspection unit 331 adds the information of the appeared website in the malicious website existence confirmation table (S4). Thereafter, the inspection unit 331 reflects the inspection result on the malicious website existence confirmation table (S5). When the inspection unit 331 has executed processing for all appeared websites listed in S2 (YES in S6), and has confirmed that the content of all websites 10 to be inspected has been inspected (YES in S7), the step moves to S8. On the other hand, when the appeared website (malicious website 20) listed in S2 is not a new one (NO in S3), the step moves to S5.

When there is, among the appeared websites listed in S2, an appeared website which has not been subjected to the processing yet (NO in S6), the step returns to S3. When there is, among the content 11 of the website 10 to be inspected, content 11 which has not been inspected yet (NO in S7), the step returns to S2.

In a case of YES in S7, the unregistration unit 333 removes (unregisters), from the blacklist 40, a malicious website 20 which has existed in any of the websites 10 at the previous inspection, but has not existed in this inspection, among the malicious websites 20 (appeared websites) stored in the malicious website existence confirmation table. The addition unit 332 adds information of the newly appeared malicious website 20 to the blacklist 40 (S8).

The monitoring device 30 executes the above processing at predetermined intervals, and performs addition and unregistration of information of the malicious website 20 to and from the blacklist 40. By doing so, the monitoring device 30 can register, on the blacklist 40, information of a new malicious website 20 described as a redirection destination in any website 10 among the websites 10 to be inspected. Thereafter, the monitoring device 30 can unregister, from the blacklist 40, information of the malicious website 20 which has been no longer described as a redirection destination in any website 10.

(Other Embodiments)

The above-described monitoring device 30 may determine whether a malicious website 20 is kept on the blacklist 40 according to the length of the lifetime of the malicious website 20.

For example, the unregistration unit 333 of the monitoring device 30 preferentially unregisters information of a malicious website 20 having shorter lifetime indicated in the malicious website existence confirmation table, among information of the malicious websites 20 registered on the blacklist 40. In addition, even in a case of information of a malicious website 20 which no longer exists in any website 10, if the lifetime of the malicious website 20 in the past indicated in the malicious website existence confirmation table is relatively long, the unregistration unit 333 may exclude the information from information to be unregistered.

By doing so, information of the malicious websites 20 which have (or have had) a relatively long lifetime is kept on the blacklist 40 preferentially in proportion to the length of the lifetime.

In addition, the monitoring device 30 may refer to the malicious website existence confirmation table and keep information of the malicious websites 20 which existed in many websites 10 in the past on the blacklist 40 preferentially in proportion to the number of the websites 10 in which the malicious website 20 existed.

The website 10 to be inspected may be corrected promptly, for example, when an administrator of the website 10 notices intrusion, or when a reminder is issued from an external organization. Therefore, a decoy website prepared in advance (see Non Patent Literature 5) may be used as the website 10. By doing so, redirection to the malicious website 20 can be observed for a long period of time. In addition, this procedure saves labor for seeking a compromised website, thereby realizing efficient observation.

According to the monitoring device 30 described above, it is possible to prevent information of a malicious website 20 which actually no longer exists from being registered permanently on the blacklist 40, without unregistering information of a malicious website 20 which actually exists from the blacklist 40. As a result, the monitoring device 30 can add information of a new malicious website 20 on the blacklist 40, and suppress an increase in the number of entries on the blacklist 40 to reduce a period of time taken for filtering processing using the blacklist 40.

(Program)

It is also possible to create a program in which processing performed by the monitoring device 30 according to the above embodiment is described in a computer-executable language. In that case, the same effect as that of the above embodiment can be obtained by a computer executing the program. Furthermore, the same processing as that of the above embodiment may be realized by recording the program in a computer-readable recording medium, and by causing a computer to read and execute the program recorded in the recording medium. Hereinbelow, a description will be given for an example of a computer which executes a monitoring program realizing the same function as that of the monitoring device 30.

Figure 6:
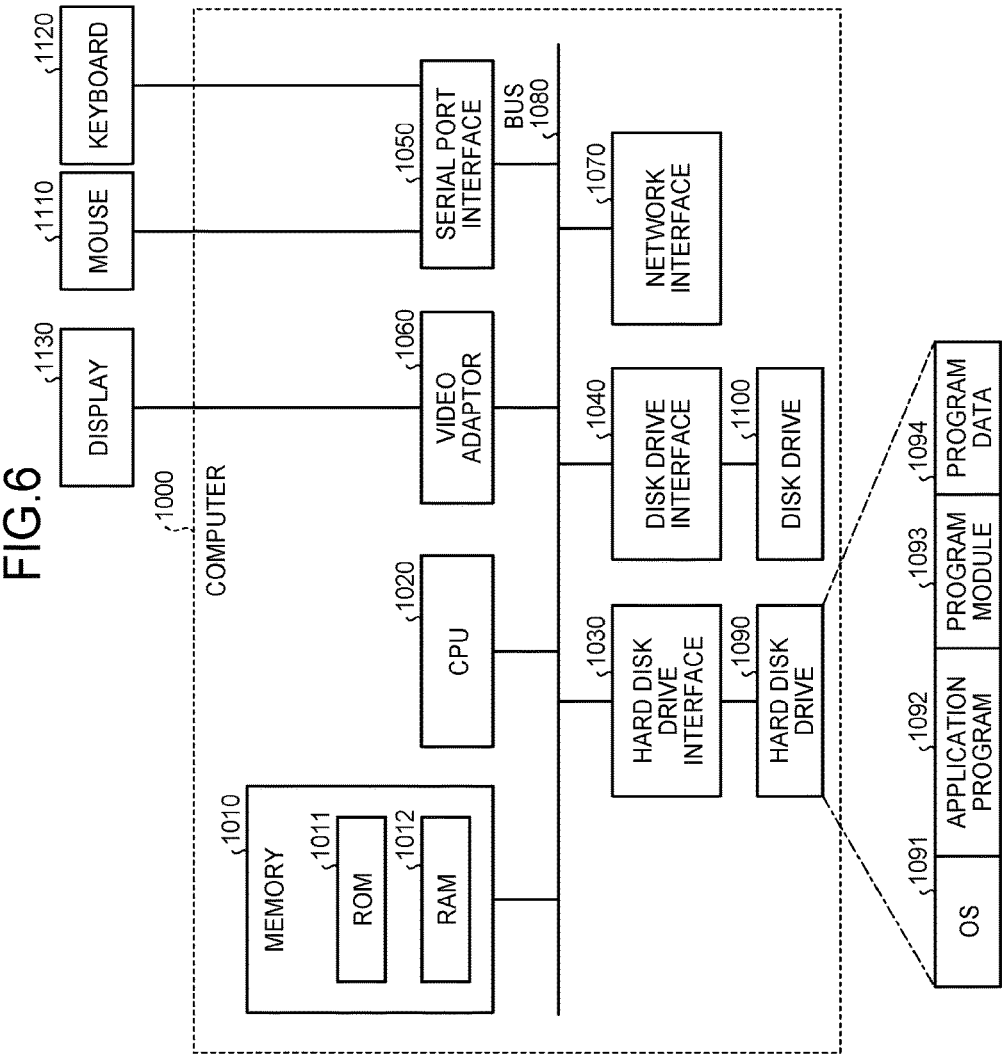
FIG. 6 is a diagram illustrating a computer which executes a monitoring program.

FIG. 6 is a diagram illustrating a computer which executes the monitoring program. As illustrated in FIG. 6, a computer 1000 includes, for example, a memory 1010, a CPU 1020, a hard disk drive interface 1030, a disk drive interface 1040, a serial port interface 1050, a video adaptor 1060, and a network interface 1070. Each of the units is connected by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a detachable storage medium such as a magnet disk and an optical disc is inserted into the disk drive 1100. For example, a mouse 1110 and a keyboard 1120 are connected to the serial port interface 1050. For example, a display 1130 is connected to the video adaptor 1060.

Here, as illustrated in FIG. 6, the hard disk drive 1090 stores, for example, an OS 1091, an application program 1092, a program module 1093, and program data 1094. The malicious website existence confirmation table described in the above embodiment is stored, for example, in the hard disk drive 1090 or the memory 1010.

The monitoring program is stored, for example, as a program module in which an instruction executed by the computer 1000 is described, in the hard disk drive 1090. Specifically, a program module is stored in the hard disk drive 1090, in which program module, each processing executed by the monitoring device 30, which has been described in the above embodiment, is described.

Data used for information processing performed by the monitoring program is stored as program data, for example, in the hard disk drive 1090. The CPU 1020 reads, as needed, the program module 1093 and the program data 1094 stored in the hard disk drive 1090 to the RAM 1012, and executes each procedure describe above.

The program module 1093 and the program data 1094 according to the monitoring program are not limited to those stored in the hard disk drive 1090. For example, the program module 1093 and the program data 1094 may be stored in a detachable storage medium and read by the CPU 1020 through the disk drive 1100 or the like. Alternatively, the program module 1093 and the program data 1094 according to the monitoring program may be stored in other computer connected through a network such as a local area network (LAN) and a wide area network (WAN), and read by the CPU 1020 through the network interface 1070.

REFERENCE SIGNS LIST

10 Website
11 Content
20 Malicious website
21 Malicious content
30 Monitoring device
31 Input/output unit
32 Communication unit
33 Control unit
34 Storage unit
40 Blacklist
331 Inspection unit
332 Addition unit
333 Unregistration unit

The invention claimed is:

1. A monitoring device comprising:
processing circuitry configured to
inspect, during an inspection performed periodically at a predetermined time interval, a redirect code inserted into content of a compromised website;
add, in accordance with a result of the inspection, when information of a new website is described in the redirect code, information of the website to a blacklist which is used to block access to websites which are included on the blacklist; and
unregister, in accordance with a result of the inspection, information of the website that was described in a redirect code in a previous inspection time period but is no longer described in the redirect code from the blacklist in a current inspection time period.

2. The monitoring device according to claim 1, wherein the processing circuitry
inspects content of one or more compromised websites,
adds, in accordance with a result of the inspection, when information of a new website is described in the redirect code in the content of at least any of the websites, information of the website to the blacklist, and
unregisters, in accordance with a result of the inspection, information of the website that is no longer described in the redirect code in the content of any website from the blacklist.

3. The monitoring device according to claim 1, wherein the processing circuitry acquires, as information of the website, a uniform resource locator (URL), a fully qualified domain name (FQDN), or an internet protocol (IP) address assigned to the FQDN.

4. A monitoring method comprising:
inspecting, during an inspection performed periodically at a predetermined time interval, a redirect code inserted into content of a compromised website;
adding, in accordance with a result of the inspection, when information of a new website is described in the redirect code, information of the website to a blacklist which is used to block access to websites which are included on the blacklist; and
unregistering, in accordance with a result of the inspection, information of the website that was described in a redirect code in a previous inspection time period but is no longer described in the redirect code from the blacklist in a current inspection time period.

5. A non-transitory computer readable storage medium having stored therein a monitoring program that causes a computer to execute a process comprising:

inspecting, during an inspection performed periodically at a predetermined time interval, a redirect code inserted into content of a compromised website;

adding, in accordance with a result of the inspection, when information of a new website is described in the redirect code, information of the website to a blacklist which is used to block access to websites which are included on the blacklist; and unregistering, in accordance with a result of the inspection, information of the website that was described in a redirect code in a previous inspection time period but is no longer described in the redirect code from the blacklist in a current inspection time period.

* * * * *